United States Patent [19]

Yamashita

[11] 4,303,298

[45] Dec. 1, 1981

[54] NEAR INFRARED ABSORPTION FILTER FOR COLOR TELEVISION CAMERAS

[75] Inventor: Toshiharu Yamashita, Hachioji, Japan

[73] Assignee: Hoya Corporation, Tokyo, Japan

[21] Appl. No.: 20,138

[22] Filed: Mar. 13, 1979

[30] Foreign Application Priority Data

Apr. 17, 1978 [JP] Japan .................................. 53/45089

[51] Int. Cl.$^3$ ............................................... G02B 5/22
[52] U.S. Cl. ..................... 350/1.1; 252/587; 350/311; 501/47; 501/48; 501/65; 501/66; 501/67; 501/904
[58] Field of Search ................. 350/1.1, 1.5, 1.6, 311; 252/300, 587; 106/47 Q, 63

[56] References Cited

U.S. PATENT DOCUMENTS

| | | | |
|---|---|---|---|
| 3,104,176 | 9/1963 | Hovey | 350/311 X |
| 3,146,120 | 8/1964 | Upton et al. | 350/1.1 X |
| 3,632,873 | 1/1972 | Henkin | 350/1.5 X |
| 3,649,311 | 3/1972 | Araujo | 350/1.1 X |
| 3,754,816 | 8/1973 | Ritze | 350/311 |
| 3,826,751 | 7/1974 | Laliberte | 252/300 |
| 3,923,527 | 12/1975 | Matsuura et al. | 106/47 Q X |
| 4,105,577 | 8/1978 | Yamashita | 252/300 |
| 4,110,245 | 8/1978 | Yamashita | 252/300 |

OTHER PUBLICATIONS

Res et al., "A Single Glass Filter With Spectral Transmittance . . . ", J. Phys. D., vol. 7, No. 17, Nov. 1974, pp. L196–L198.

Primary Examiner—John D. Lee
Attorney, Agent, or Firm—Sughrue, Mion, Zinn, Macpeak & Seas

[57] ABSTRACT

A near infrared absorption filter for color television cameras, comprising
(a) a base glass comprising, in % by weight based on the weight of the base glass, 50–78% $P_2O_5$, 10–50% BaO, 0–7% $Al_2O_3$, 0–6% $B_2O_3$, 0–5% $SiO_2$, 0–8% $Li_2O$, 0–15% $Na_2O$, 0–18% $K_2O$, 0–5% MgO, 0–10% CaO, 0–15% SrO, 0–10% ZnO, and 0–10% PbO, and
(b) about 0.5 to about 2.5% by weight of CuO based on the weight of the base glass.

6 Claims, 1 Drawing Figure

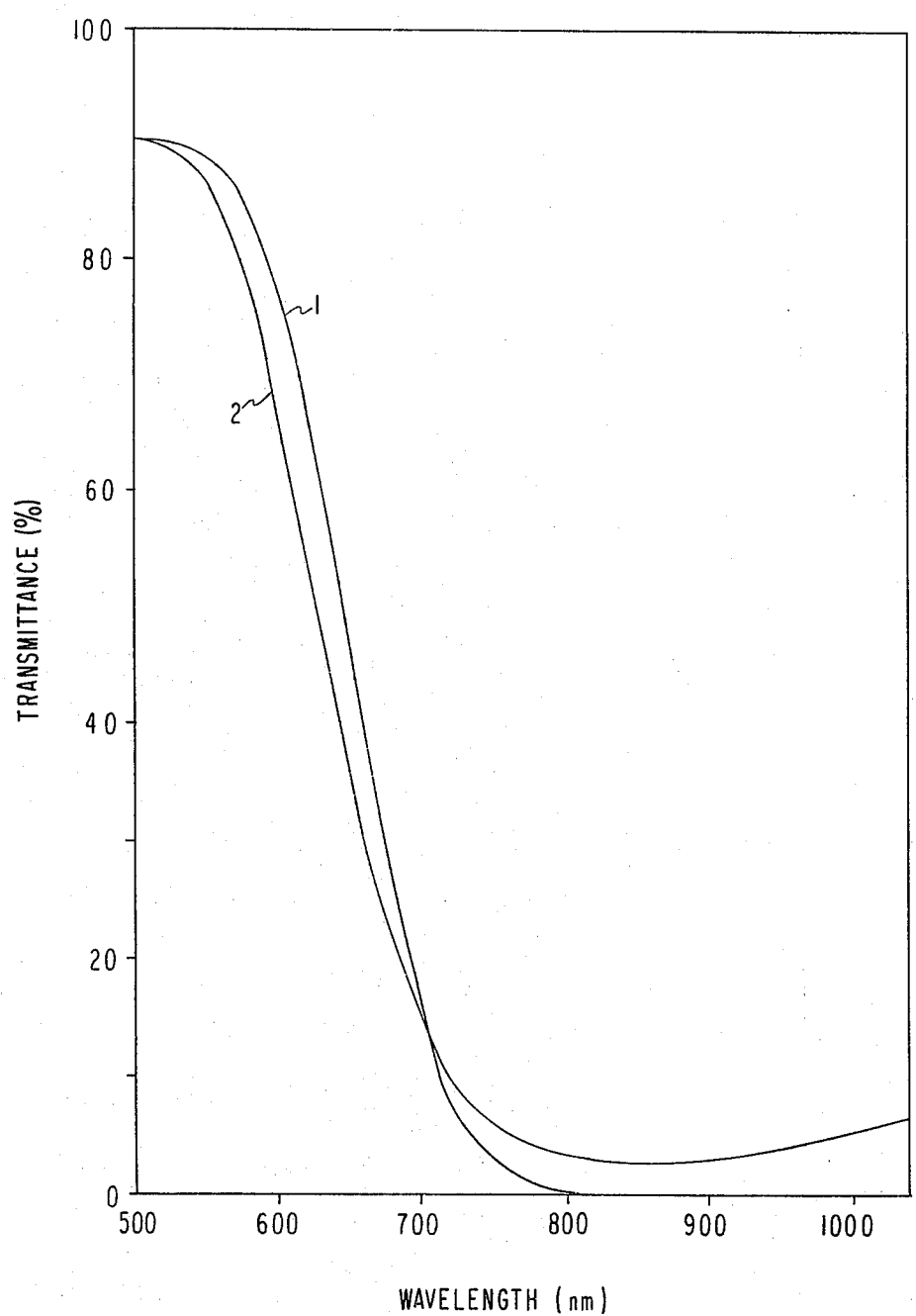

NEAR INFRARED ABSORPTION FILTER FOR COLOR TELEVISION CAMERAS

BACKGROUND OF THE INVENTION

1. Field of the Invention

This invention relates to a near infrared absorption filter having a high transmission in the visible region and a sharp absorption at about 600 to about 700 nm.

2. Description of the Prior Art

In color television camera tubes, the spectral sensitivity of the photoelectric element extends to the infrared region. Unless the infrared light is cut off, good color reproduction cannot be obtained. Hence, an infrared absorption filter is required.

A conventional infrared absorption filter comprises a heat-absorbing filter utilizing $Fe^{2+}$ ion coloration and a multi-layered coating formed thereon to permit relatively sharp absorption of light having a wavelength of about 600 nm or more. The filter is very expensive, and the spectral characteristics thereof fluctuate over a fairly broad range.

It is generally said that unless a filter has a transmission at 600 nm of about 75% or more and a transmission at 700 nm of about 15% or less, color reproduction will be aggravated. Conventional near infrared filters containing copper do not have such sharp absorption characteristics and have low transmission at 600 nm when their transmission at 700 nm is 15%. Hence, such cannot be used as infrared absorption filters for color television cameras.

SUMMARY OF THE INVENTION

Accordingly, an object of this invention is to provide a near infrared absorption filter comprising a glass having a sharp absorption characteristic with high transmission at 600 nm and a low transmission at 700 nm, which has superior chemical durability, is inexpensive, and does not appreciably change in spectral transmission characteristics.

The above object of this invention can be achieved by a near infrared absorption filter for color television cameras which has the following composition:

(a) a base glass comprising, in % by weight based on the weight of the base glass, 50-75% $P_2O_5$, 10-50% BaO, 0-7% $Al_2O_3$, 0-6% $B_2O_3$, 0-5% $SiO_2$, 0-8% $Li_2O$, 0-15% $Na_2O$, 0-18% $K_2O$, 0-5% MgO, 0-10% CaO, 0-15% SrO, 0-10% ZnO and 0-10% PbO, and (b) about 0.5 to about 2.5% by weight of CuO based on the weight of the base glass.

BRIEF DESCRIPTION OF THE DRAWING

The FIGURE is a graph showing spectral transmission curves of the glass according to this invention and of a commercially available glass.

DETAILED DESCRIPTION OF THE INVENTION

One example of a glass containing BaO as a network modifier which shows a sharp absorption characteristic and has superior water resistance is shown below. A comparison is set forth below between infrared filter compositions wherein the base glass contains $P_2O_5$, $Al_2O_3$ and a divalent metal oxide as the modifier component. For the comparison, various divalent metal oxides are substituted for BaO, the divalent metal oxide modifier component used in the present invention. In order that the modifier component be used in the same molar concentration, the amount of $P_2O_5$ and $Al_2O_3$ in the base glass composition is set at 61.5 and 3.5 mol %, respectively. Thus, the molar concentration of the divalent metal oxide is 35 mol %. It is clear from the results shown in Table 2 below that when the transmission at 700 nm is 15%, the transmission at 600 nm is highest for BaO, showing sharp absorption. Table 2 further shows that a glass containing BaO has a 600 nm transmission near the critical transmission of 75% color reproduction, whereas glasses with other components have a considerably lower transmission and cannot give good color reproduction. The same can be said for the corresponding weight % composition.

TABLE 1

| Base Glass Composition (wt%) | | | |
|---|---|---|---|
| $P_2O_5$ (61.5 mole%) | $Al_2O_3$ (3.5 mole%) | Divalent metal oxide (35 mole%) | CuO* |
| 83.2 | 3.4 | MgO 13.4 | 1.30 |
| 79.0 | 3.2 | CaO 17.8 | 1.46 |
| 68.7 | 2.8 | SrO 28.5 | 1.48 |
| 73.2 | 3.0 | ZnO 23.8 | 1.34 |
| 60.4 | 2.5 | BaO 37.1 | 1.52 |

TABLE 2

| Divalent Metal Oxide | Transmission at 700 nm (%) | Transmission at 600 nm (%) | Water Resistance Weight Loss (wt %) |
|---|---|---|---|
| MgO | 15.0 | 68.3 | 0.62 |
| CaO | 15.0 | 71.6 | 1.73 |
| SrO | 15.0 | 71.6 | 0.41 |
| ZnO | 15.0 | 70.0 | 12.05 |
| BaO | 15.0 | 74.2 | 0.17 |

The water resistance weight loss was measured by a powder method according to the Association of Japanese Optical Glass Industry. The water resistance weight loss is smallest for BaO, and glasses containing the other ingredients do not have satisfactory water resistance for practical application.

With respect to an alkali metal oxide, the sharpness of absorption is the worst with $Li_2O$, and the best with $K_2O$. A glass containing $Li_2O$, $Na_2O$ and/or $K_2O$, however, has extremely poor chemical durability, and when a large amount of $Al_2O_3$ is introduced to increase chemical durability, the sharpness of absorption of the glass becomes lower than the glass containing BaO. Furthermore, the chemical durability of the glass containing the alkali metal oxide cannot be made better than the glass containing BaO.

Referring to the accompanying drawing, Curve 1 is a spectral transmission of a glass according to Example 23 of this invention described hereinafter whose thickness has been changed to 1.48 mm so that the transmission at 700 nm becomes 15%, and Curve 2 is the spectral transmission of a commercially available glass filter whose thickness has been changed to 0.90 mm so that the transmission at 700 nm becomes 15%.

It is seen from the graph that the absorption of the glass of this invention is sharp and the transmission thereof at 600 nm is 75% or more, whereas the commercially available glass has a transmission at 600 nm of 70% or less. When these transmissions at a wavelength region longer than 700 nm are examined, it is observed that the commercially available glass does not show complete absorption, whereas the glass of the invention shows complete absorption. Thus, the glass filter of the invention is superior in this respect, too.

Thus, addition of CuO to a phosphate glass containing BaO as a glass network modifier can provide a near infrared absorption filter which has a sharp absorption, superior ability for color television cameras to absorb light in the near infrared region, and good chemical durability.

The reasons for the limitation on the proportions of the constituents of the glass of this invention are described below. The weight percent for $P_2O_5$, BaO, $Al_2O_3$, $B_2O_3$, $SiO_2$, $Li_2O$, $Na_2O$, $K_2O$, MgO, CaO, SrO, ZnO and PbO is based on the weight of the basic glass.

If the proportion of $P_2O_5$ is less than 50%, a glass having a sharp absorption cannot be obtained. If the proportion thereof exceeds 75% by weight, the sharpness of absorption increases, but the glass tends to devitrify.

If the amount of BaO is more than 50% by weight or less than 10% by weight, a glass showing a sharp absorption cannot be obtained. If the amount is less than 10% by weight, the glass tends to devitrify.

$Al_2O_3$, $B_2O_3$ and $SiO_2$ increase the chemical durability of glass. However, the sharpness of absorption is better as the amount of these ingredients becomes smaller. The desired glass having sharp absorption cannot be obtained unless the proportions of $Al_2O_3$, $B_2O_3$ and $SiO_2$ are 7% by weight or less, 6% by weight or less, and 5% by weight or less, respectively. The optimal amount of $Al_2O_3$ is about 0.5 to about 6.0% by weight from the standpoint of the chemical durability and the sharp absorption of the glass.

An alkali metal oxide increases the near infrared absorption due to the copper ion. Thus, when at least one alkali metal oxide is added in an amount of about 0.5% by weight or more together with BaO, a very suitable filter which has a sharp absorption at 600 to 700 nm and completely absorbs near infrared light at 800nm or more can be obtained. From the standpoint of the sharpness of absorption, chemical durability, and devitrification, the total amount of BaO and the alkali metal oxide is preferably 25 to 45%.

The alkali metal oxide decreases the sharpness of absorption to a lower degree than divalent metal oxides other than BaO, but deteriorates the chemical durability of the glass, lowers the viscosity thereof, and increases the rate of devitrification thereof. Accordingly, the amounts of $Li_2O$, $Na_2O$ and $K_2O$ should be limited to 8% by weight or less, 15% by weight or less, and 18% by weight or less, respectively, and the total amount of $Li_2O$, $Na_2O$ and $K_2O$ should be limited to 18% by weight or less. Accordingly, a preferred amount for the total $LiO_2$, $Na_2O$ and $K_2O$ is 0.5 to 18% by weight.

Introduction of MgO, CaO, SrO and ZnO increases the viscosity of the glass, facilitates the production thereof, and improves its mechanical characteristics, but, on the other hand, these ingredients deteriorate the sharpness of absorption. Therefore, the amount of MgO is preferably limited to 5% by weight or less; the amount of CaO or ZnO, to 10% by weight or less; and the amount of SnO, to 15% by weight or less.

PbO decreases the sharpness of absorption only slightly, but reduces the hardness and viscosity of the glass, making production or processing of the glass difficult. The suitable amount of PbO is therefore 10% by weight or less.

The suitable amount of CuO is 0.5 to 2.5% by weight based on the weight of the base glass described above. If the thickness of the glass filter be changed from the range of 1.5 to 3.0 mm for the purpose of practical use, the amount of CuO may be changed accordingly. When the glass filter is thick, the amount of CuO is small. That is, the amount of CuO varies inversely with the thickness of the glass.

EXAMPLES

This invention is now explained in more detail by reference to the Examples described hereinafter. Each component is shown by wt %.

| | Example No. | | | | | | | |
|---|---|---|---|---|---|---|---|---|
| | 1 | 2 | 3 | 4 | 5 | 6 | 7 | 8 |
| $P_2O_5$ | 53.1 | 58.1 | 57.3 | 59.4 | 65.2 | 57.9 | 60.5 | 60.8 |
| BaO | 46.9 | 41.9 | 42.0 | 33.8 | 30.1 | 37.1 | 29.4 | 29.4 |
| CuO | 1.90 | 1.65 | 1.85 | 1.70 | 1.71 | 1.48 | 1.82 | 1.89 |
| $Al_2O_3$ | | | 0.7 | 2.2 | 2.7 | | 2.4 | 2.4 |
| $B_2O_3$ | | | | | | 5.0 | 1.7 | |
| $SiO_2$ | | | | | | | | 1.4 |
| $K_2O$ | | | | | | | 6.0 | 6.0 |
| $Na_2O$ | | | | 4.6 | | | | |
| $Li_2O$ | | | | | 2.0 | | | |
| SrO | | | | | | | | |
| CaO | | | | | | | | |
| MgO | | | | | | | | |
| ZnO | | | | | | | | |
| PbO | | | | | | | | |
| $T_{600}$ (%) at $T_{700}$ = 15% | 75.9 | 75.8 | 75.4 | 76.3 | 76.0 | 75.0 | 76.3 | 75.4 |
| Water Resistance Weight Loss (%) | 0.15 | 0.20 | 0.25 | 0.12 | 0.16 | 0.30 | 0.23 | 0.21 |

| | 9 | 10 | 11 | 12 | 13 | 14 | 15 | 16 |
|---|---|---|---|---|---|---|---|---|
| $P_2O_5$ | 68.6 | 74.2 | 62.8 | 62.3 | 58.3 | 59.0 | 60.4 | 58.9 |
| BaO | 11.3 | 12.1 | 23.0 | 15.5 | 33.4 | 33.8 | 34.6 | 28.1 |
| CuO | 1.91 | 1.66 | 2.03 | 2.11 | 1.82 | 1.72 | 1.51 | 1.93 |
| $Al_2O_3$ | 6.4 | 6.6 | 5.7 | 6.3 | 2.6 | 2.6 | 2.7 | 2.6 |
| $B_2O_3$ | | | | | | | | |
| $SiO_2$ | | | | | | | | |
| $K_2O$ | | | 8.5 | 15.9 | 3.4 | 3.5 | | 10.4 |
| $Na_2O$ | 13.7 | | | | 2.3 | | | |
| $Li_2O$ | | 7.1 | | | | 1.1 | 2.3 | |
| SrO | | | | | | | | |
| CaO | | | | | | | | |
| MgO | | | | | | | | |
| ZnO | | | | | | | | |
| PbO | | | | | | | | |
| $T_{600}$ (%) at $T_{700}$ = 15% | 75.7 | 75.0 | 75.5 | 76.5 | 76.6 | 76.1 | 75.8 | 76.8 |
| Water Resistance Weight Loss (%) | 0.28 | 0.18 | 0.15 | 0.30 | 0.10 | 0.10 | 0.08 | 0.24 |

| | 17 | 18 | 19 | 20 | 21 | 22 | 23 |
|---|---|---|---|---|---|---|---|
| $P_2O_5$ | 63.2 | 64.3 | 68.8 | 62.4 | 62.9 | 57.5 | 57.3 |
| BaO | 24.2 | 24.6 | 13.2 | 17.9 | 21.7 | 27.5 | 37.6 |
| CuO | 2.01 | 1.45 | 1.48 | 1.50 | 1.45 | 1.50 | 1.60 |
| $Al_2O_3$ | 2.8 | 2.9 | 3.1 | 2.8 | 2.8 | 2.6 | 1.8 |
| $B_2O_3$ | | | | | | | |
| $SiO_2$ | | | | | | | |
| $K_2O$ | | | | | | | 3.3 |
| $Na_2O$ | 9.8 | 5.0 | 5.3 | 4.8 | 4.9 | 4.4 | |
| $Li_2O$ | | | | | | | |
| SrO | | | | 12.1 | | | |
| CaO | | | 9.6 | | | | |
| MgO | | 3.2 | | | | | |
| ZnO | | | | | | 7.7 | |
| PbO | | | | | | | 8.0 |
| $T_{600}$ (%) at $T_{700}$ = 15% | 77.9 | 75.4 | 75.0 | 75.8 | 75.3 | 76.0 | 76.8 |
| Water Re- | | | | | | | |

| -continued | | | | | | | |
|---|---|---|---|---|---|---|---|
| sistance Weight Loss (%) | 0.29 | 0.10 | 0.18 | 0.11 | 0.16 | 0.10 | 0.14 |

Glasses having the compositions shown in the above Examples have a transmission at 600 nm of 75% or more when the transmission at 700 nm is 15%. When the glasses are used as near infrared absorption filters for color television cameras, good color reproduction can be obtained. The glasses also have practical water resistance indicated in terms of water resistance weight loss of 0.30% or less.

Suitable raw materials for the glass of this invention are, for example, $H_3PO_4$, $P_2O_5$, $Al(OH)_3$, $Al_2O_3$, $H_3BO_3$, $SiO_2$, alkali metal carbonates, alkali metal nitrates, carbonates of Ba, Mg or Ca, nitrates of Ba, Sr or Pb, ZnO, PbO, CuO, and the like. Materials having reducibility are unsuitable for production of the glass of this invention.

The glass of this invention can be obtained by uniformly mixing the raw materials having the above-described components, melting the mixture in a ceramic or platinum crucible at about 1100° C. to about 1250° C., stirring and purifying the melt, casting the same into a mold, and annealing the molding.

Since the glass in accordance with this invention has a sharper absorption and better chemical durability than conventional glasses of this kind, the glass can be used not only as near infrared absorption filters for color television cameras, but also as color printing or for correction of photosensitive elements.

By subjecting the glass of the invention to a treatment for increasing transmission, the transmission in a high transmission area at 600 nm or less can be increased greatly while reducing the increase of the transmission near 700 nm, and, therefore, the sharpness of absorption can be further improved. One such treatment is to coat the glass with a thin coating of a low refractive index component, such as $MgF_2$ or the like, to decrease the reflectivity of the glass and increase the transmittance.

While the invention has been described in detail and with reference to specific embodiments thereof, it will be apparent to one skilled in the art that various changes and modifications can be made therein without departing from the spirit and the scope thereof.

What is claimed is:

1. A near infrared absorption filter for color television cameras, comprising
   (a) a base glass consisting essentially of, in % by weight, 50–75% $P_2O_5$, 10–50% BaO, 0–7% $Al_2O_3$, 0–6% $B_2O_3$, 0–5% $SiO_2$, 0–8% $Li_2O$, 0–15% $Na_2O$, 0–18% $K_2O$, 0–5% MgO, 0–10% CaO, 0–15% SrO, 0–10% ZnO, and 0–10% PbO, and
   (b) about 0.5 to about 2.5% by weight of CuO based on the weight of the base glass,
   (c) and wherein the total amount of said BaO and at least one of said $Li_2O$, $Na_2O$ and $K_2O$ is 25–45% by weight.

2. The near infrared absorption filter of claim 1, wherein the total amount of said $Li_2O$, $Na_2O$ and $K_2O$ is 0.5 to 18% by weight.

3. The near infrared absorption filter of claim 1, wherein the amount of $Al_2O_3$ is 0.5 to 6.0% by weight.

4. A near infrared absorption filter for color television cameras, comprising
   (a) a base glass consisting essentially of, in % by weight, 50–75% $P_2O_5$, 10–50% BaO, 0–7% $Al_2O_3$, 0–6% $B_2O_3$, 0–5% $SiO_2$, 0–8% $Li_2O$, 0–15% $Na_2O$, 0–18% $K_2O$, 0–5% MgO, 0–10% CaO, 0–15% SrO, 0–10% ZnO, and 0–10% PbO, and
   (b) about 0.5 to about 2.5% by weight of CuO based on the weight of the base glass, said glass having a transmission at 600 nm of 75% or more when the transmission at 700 nm is 15%,
   (c) and wherein the total amount of said BaO and at least one of said $Li_2O$, $Na_2O$ and $K_2O$ is 25–45% by weight.

5. The near infrared absorption filter of claim 4, wherein the total amount of said $Li_2O$, $Na_2O$ and $K_2O$ is 0.5 to 18% by weight.

6. The near infrared absorption filter of claim 4, wherein the amount of $Al_2O_3$ is 0.5 to 6.0% by weight.

* * * * *